US010458313B2

(12) United States Patent
Kollár et al.

(10) Patent No.: US 10,458,313 B2
(45) Date of Patent: Oct. 29, 2019

(54) MULTIFUNCTIONAL ROTARY VALVE MODULE

(71) Applicant: Hanon Systems, Daejeon (KR)

(72) Inventors: L'uboslav Kollár, Poriadie (SK); Carsten Ohrem, Bergheim (DE); Jiří Bazala, Korytná (CZ); Guillaume Hébert, StaréMěsto (CZ); Ivo Vaverka, Bojkovice (CZ)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/685,540

(22) Filed: Aug. 24, 2017

(65) Prior Publication Data

US 2018/0087449 A1 Mar. 29, 2018

Related U.S. Application Data

(60) Provisional application No. 62/400,337, filed on Sep. 27, 2016.

(51) Int. Cl.

*F02B 29/04* (2006.01)
*F01N 5/02* (2006.01)
*F16K 11/085* (2006.01)
*F01D 25/12* (2006.01)
*F01P 3/20* (2006.01)
*F01P 7/14* (2006.01)

(52) U.S. Cl.

CPC ............ *F02B 29/0418* (2013.01); *F01N 5/02* (2013.01); *F16K 11/0853* (2013.01); *F01D 25/12* (2013.01); *F01P 3/20* (2013.01); *F01P 2007/146* (2013.01)

(58) Field of Classification Search

CPC ........ F02M 26/13; F02M 26/16; F02M 26/21; F02M 26/22; F02M 26/23; F02M 26/25; F02M 26/26; F02M 26/27; F02M 26/28

See application file for complete search history.

(56) References Cited

U.S. PATENT DOCUMENTS 2,388,890 A * 11/1945 Whitted ............. F16K 11/0853 137/625.43
3,191,628 A * 6/1965 Kirkwood ........... F16K 11/0853 137/312
3,499,467 A * 3/1970 Lang, Jr. ............. F16K 11/0836 137/625.19
4,164,956 A * 8/1979 Takahashi ............... B29B 7/801 137/242
5,273,073 A * 12/1993 Romanchik ......... F16K 11/0853 137/625.46

(Continued)

FOREIGN PATENT DOCUMENTS

KR 20060063077 A 6/2006
KR 20080067616 A 7/2008

*Primary Examiner* — Carl C Staubach

(74) *Attorney, Agent, or Firm* — Shumaker, Loop & Kendrick, LLP; James D. Miller

(57) ABSTRACT

An engine exhaust gas circuit includes a primary circuit in fluid communication with an intake of an engine and an outlet of the engine. The primary circuit conveys a gas from the outlet of the engine to the inlet of the engine. The primary circuit including a valve body having a rotary flap rotatably disposed in the valve body. A bypass circuit extends from a branch point intermediate the outlet of the engine and the valve body to the valve body.

7 Claims, 2 Drawing Sheets

16
15
12
10
20
22
7
5
14
2
8
10
4
3
9
1
18
6

(56) References Cited

U.S. PATENT DOCUMENTS

| | | | | |
|---|---|---|---|---|
| 5,771,928 A * | 6/1998 | Zepic | F16K 11/0853 137/625.22 |
| 7,950,376 B2 * | 5/2011 | Rollet | F02M 26/50 123/568.12 |
| 7,958,874 B2 * | 6/2011 | Kobayashi | F02M 26/26 123/568.12 |
| 2010/0288955 A1 * | 11/2010 | Bonanno | F16K 11/0853 251/209 |
| 2016/0115910 A1 * | 4/2016 | Bramson | F01N 5/02 123/568.12 |
| 2016/0290205 A1 * | 10/2016 | Hebert | F01N 5/02 |
| 2017/0082008 A1 * | 3/2017 | Kim | F01N 5/02 |
| 2017/0335805 A1 * | 11/2017 | Zhang | F01P 3/20 |
| 2018/0073444 A1 * | 3/2018 | Zhang | F02D 41/0007 |

* cited by examiner

MULTIFUNCTIONAL ROTARY VALVE MODULE

CROSS-REFERENCE TO RELATED APPLICATIONS

This patent application claims the benefit of U.S. Provisional Patent Application Ser. No. 62/400,337, filed on Sep. 27, 2016. The entire disclosures of the above patent applications are hereby incorporated herein by reference.

FIELD

The present invention relates to a rotary valve module, and more particularly to a rotary valve module for an engine gas flow circuit of a motor vehicle.

BACKGROUND OF THE INVENTION

As commonly known, exhaust gas recirculation (EGR) systems and Exhaust Heat Recovery systems (EHRS) are employed with motor vehicles with an internal combustion engine to minimize engine exhaust gas emissions and to maximize efficiency of the engine and/or batteries for hybrid vehicles.

Multiple valves are typically required to maximize control of the gases flowing through primary exhaust gas circuits and EGR/EHRS circuits to either an exhaust outlet to the environment and/or an intake of the engine of the vehicle. However, multiple valves maximize manufacturing complexity and costs.

Accordingly, it would be desirable to provide a single rotary valve that controls the gases flowing through the primary circuit and the EGR/EHRS circuits efficiently while minimizing manufacturing complexity and costs.

SUMMARY OF THE INVENTION

In accordance and attuned with the present invention, a single rotary valve that controls the gases flowing through the primary circuit and the EGR/EHRS circuits efficiently while minimizing manufacturing complexity and costs has surprisingly been discovered.

According to an embodiment of the disclosure, an engine exhaust gas circuit is disclosed and includes a primary circuit in fluid communication with an intake of an engine and an outlet of the engine. The primary circuit conveys a gas from the outlet of the engine to the inlet of the engine. The primary circuit including a valve body having a rotary flap rotatably disposed in the valve body. A bypass circuit extends from a branch point intermediate the outlet of the engine and the valve body to the valve body.

According to another embodiment of the disclosure, an engine exhaust gas circuit is disclosed. The engine exhaust gas circuit includes a primary circuit in fluid communication with an intake of an engine and an outlet of the engine. The primary circuit conveys a gas from the outlet of the engine to the inlet of the engine and includes a valve body having a rotary flap rotatably disposed in the valve body. The rotary flap selectively permits the gas to be divided into partial mass flows to the environment and the intake of the engine or an entirety of the gas to flow to the environment. A bypass circuit extends from a branch point intermediate the outlet of the engine and the valve body to the valve body. The bypass circuit has a heat exchanger disposed therein.

According to yet another embodiment of the disclosure, an engine exhaust gas circuit is disclosed. The engine exhaust gas circuit includes a primary circuit in fluid communication with an intake of an engine and an outlet of the engine. The primary circuit conveys a gas from the outlet of the engine to the inlet of the engine. A bypass circuit extends from a branch point intermediate the outlet of the engine and the valve body to the valve body. The bypass circuit has a heat exchanger disposed therein. A single valve body receives the gas from the primary circuit and the bypass circuit and conveys the gas to the environment. The single valve body has a rotary flap rotatably disposed therein. A first portion of the rotary flap is selectively preventing gas from one of flowing to the valve body from the primary circuit and flowing from the valve body to the intake of the engine.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT

Figure 1:
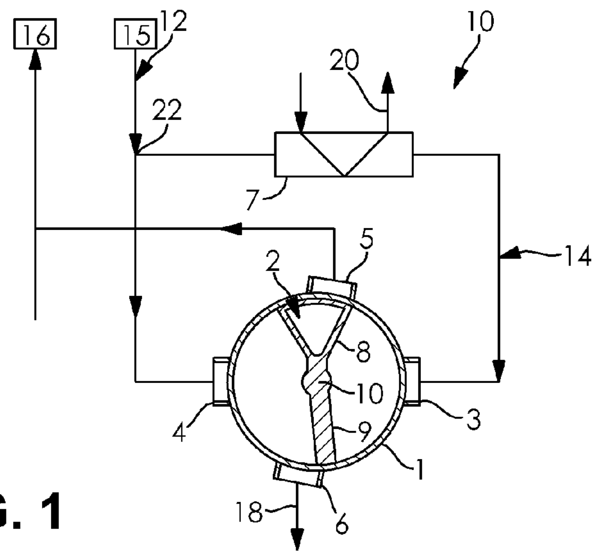
FIG. 1 illustrates an engine exhaust gas circuit according to an embodiment of the disclosure.

The following detailed description and appended drawings describe and illustrate various exemplary embodiments of the invention. The description and drawings serve to enable one skilled in the art to make and use the invention, and are not intended to limit the scope of the invention in any manner.

As shown in FIGS. 1-6 an engine exhaust gas circuit 10 of a vehicle is disclosed. The engine exhaust gas circuit 10 includes a primary circuit 12 and a bypass circuit 14. The primary circuit 12 conveys gas from an outlet 15 of an engine to a valve body 1. The gas flows into the valve body 1 through a gas inlet 4 from the engine. The primary circuit 12 then conveys the gas from the valve body 1 to an intake 16 of the engine through a gas outlet 5. As the gas flows through the valve body 1, the gas can be released or exhausted to the environment 18 through a gas outlet 6 to an exhaust.

The bypass circuit 14 is configured as an exhaust gas recirculation (EGR) system, Exhaust Heat Recovery system (EHRS), and/or oil conditioning system. The bypass circuit 14 includes a heat exchanger 7. The heat exchanger 7 provides heat transfer between the gas flowing through the bypass circuit 14 and a coolant circuit 20 of the vehicle. The bypass circuit 14 extends from a branch point 22 downstream of the outlet of the engine 15 and upstream of the valve body 1 through the heat exchanger 7. The bypass circuit 14 then extends from the heat exchanger 7 to the valve body 1 through a bypass gas inlet 3 of the valve body 1. The gas from the bypass circuit 14 passing through the valve body 1 enters the primary circuit 12 through the gas outlet 5 to the intake 16. The direction of flow of the gas through the engine exhaust gas circuit 10 is indicated by arrows.

The valve body 1 includes a rotary flap 2 rotatably disposed within the valve body 1. The rotary flap 2 has a cross-sectional shape as shown in FIGS. 1-6 and rotates to selectively close one of the inlets 3, 4 and the outlets 5, 6. As shown, a first portion 8 of the rotary flap 2 has a substantially sector or triangular cross-sectional shape and a second portion 9 of the rotary flap 2 has a substantially linear elongate cross-sectional shape. The first portion 8 selectively closes one of the inlets 3, 4 and the outlets 5, 6 or is positioned wherein the first portion 8 is intermediate adjacent ones of the inlets 3, 4 and the outlets 5, 6. The rotary flap 2 rotates about an axis 10. The rotary flap 2 is rotatably actuated by a motor (not shown), for example. Although, other types of actuators can be employed, as desired.

The inlets 3, 4 and the outlets 5, 6 are disposed about a circumference of the valve body 1 in the following arrangement: the gas outlet 5 to the intake, the gas inlet 3 from the bypass circuit 14, the gas outlet 6 to the exhaust, and the gas inlet 4 from the engine. However, it is understood other arrangements can be contemplated, if desired. Additionally, it is understood more than four inlets/outlets can be contemplated, depending on the number of circuits and/or bypass circuits. Further, although the valve body is shown having a circular cross-sectional shape, it is understood other shapes can be used as desired.

Figure 2:
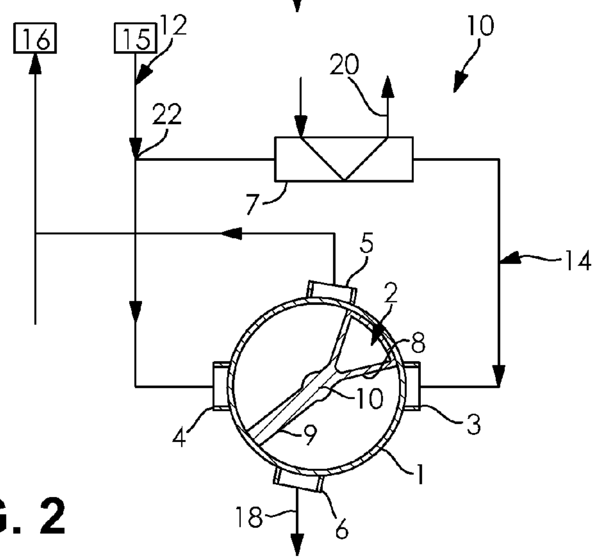
FIG. 2 illustrates the engine exhaust gas circuit of FIG. 1 during a first vehicle mode.

As shown in FIG. 2, during a start-up mode such as during an initial start of the engine, the first portion 8 of the rotary flap 2 is disposed intermediate the gas outlet 5 to the intake and the gas inlet 3 from the bypass circuit 14, wherein the inlets 3, 4 and the outlets 5, 6 are all open. In the start-up mode, the gas from the engine flows through both the bypass circuit 14 and the primary circuit 12. Advantageously, the engine exhaust gas circuit 10 in the start-up mode facilitates heating the coolant flowing through the coolant circuit 20. The gas from the outlet 15 of the engine flows through the heat exchanger 7 of the bypass circuit 14 and heat is transferred from the gas to the coolant flowing through the coolant circuit 20. In the start-up mode, the gas from the outlet 15 of the engine flowing through the primary circuit 12 flows through the gas inlet 4 from the engine and the gas outlet 5 to the intake. Gas is exhausted through the gas outlet 6 to the exhaust.

Figure 3:
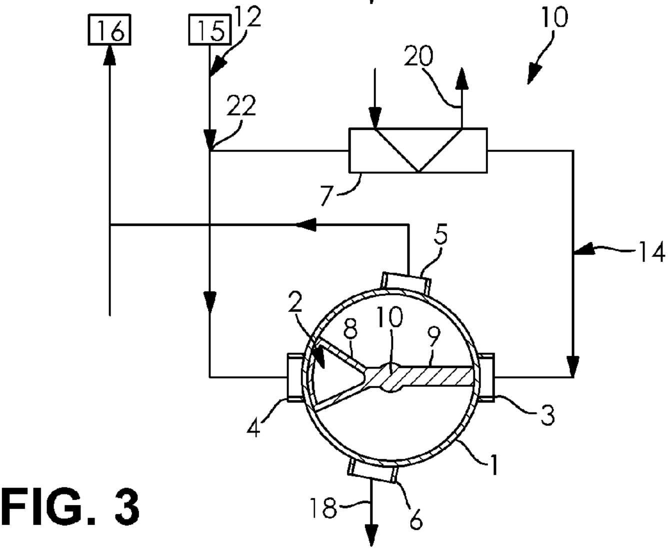
FIG. 3 illustrates the engine exhaust gas circuit of FIG. 1 during a second vehicle mode.

In FIG. 3, a bypass mode is shown wherein during a time after the initial start, the first portion 8 of the rotary flap 2 closes the gas inlet 4 from the engine. In the bypass mode, the gas from the outlet 15 of the engine flows through the bypass circuit 14 and is then conveyed to both the gas outlet 6 to the exhaust and the intake 16 of the engine through the gas outlet 5 to the intake 16. Advantageously, the engine exhaust gas circuit 10 in the bypass mode further facilitates heating the coolant flowing through the coolant circuit 20. In the bypass mode, the gas from the outlet 15 of the engine is split between the gas outlet 6 to the exhaust and the gas outlet 5 to the intake 16 in a required ratio. All of the gas flows through the heat exchanger 7 of the bypass circuit 14 to transfer maximized heat from the engine exhaust gas circuit 10.

Figure 4:
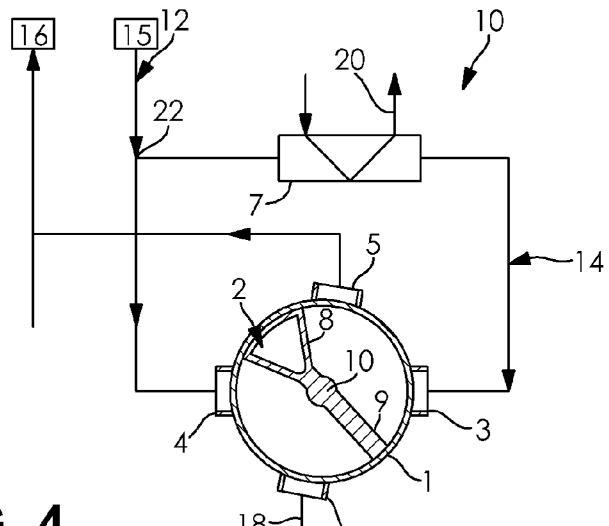
FIG. 4 illustrates the engine exhaust gas circuit of FIG. 1 during a third vehicle mode.

As shown in FIG. 4, during a first gas cooling mode, the first portion 8 of the rotary flap 2 is disposed intermediate the gas inlet 4 from the engine and the gas outlet 5 to the intake 16. In the first gas cooling mode, the bypass gas inlet 3, the gas inlet 4 from the engine, the gas outlet 6 to the exhaust, and the gas outlet 5 to the intake 16 are open. The gas from the engine flows through the bypass circuit 14 and the primary circuit 12 and is conveyed to both the gas outlet 6 to the exhaust and the intake 16 of the engine through the gas outlet 5 to the intake 16. Advantageously, the engine exhaust gas circuit 10 in the first gas cooling mode facilitates heating the coolant flowing through the coolant circuit 20 and heating an engine oil. In the first gas cooling mode, a first portion of the gas is cooled in the heat exchanger 7 and flows through the bypass circuit 14 and through the valve body 1 to the intake 16 of the engine. A second portion of the gas is exhausted through the gas outlet 6 to the exhaust.

Figure 5:
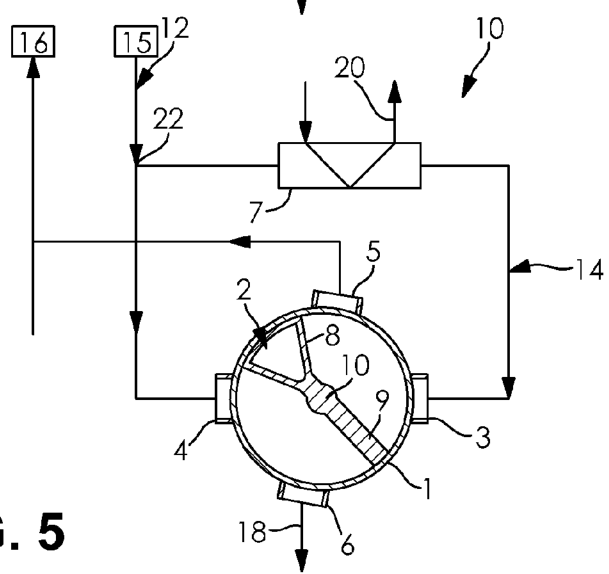
FIG. 5 illustrates the engine exhaust gas circuit of FIG. 1 during a fourth vehicle mode.

As shown in FIG. 5, during a second gas cooling mode, the first portion 8 of the rotary flap 2 is disposed intermediate the gas inlet 4 from the engine and the gas outlet 5 to the intake. In the second gas cooling mode, the first portion 8 of the rotary flap 2 is in substantially the same position as the first gas cooling mode. In the second gas cooling mode, the bypass gas inlet 3, the gas inlet 4 from the engine, the gas outlet 6 to the exhaust, and the gas outlet 5 to the intake 16 are open. The gas from the engine in the second gas cooling mode flows through the bypass circuit 14 and the primary circuit 12 and is conveyed to both the gas outlet 6 to the exhaust and the intake 16 of the engine through the gas outlet 5 to the intake 16. Advantageously, the engine exhaust gas circuit 10 in the second gas cooling mode facilitates heating the coolant flowing through the coolant circuit 20 and heating the engine oil. In the second gas cooling mode, a first portion of the gas is cooled in the heat exchanger 7 and flows through the bypass circuit 14 and the valve body 1 to the intake 16 of the engine. A second remaining portion of the gas is exhausted through the gas outlet 6 to the exhaust.

Figure 6:
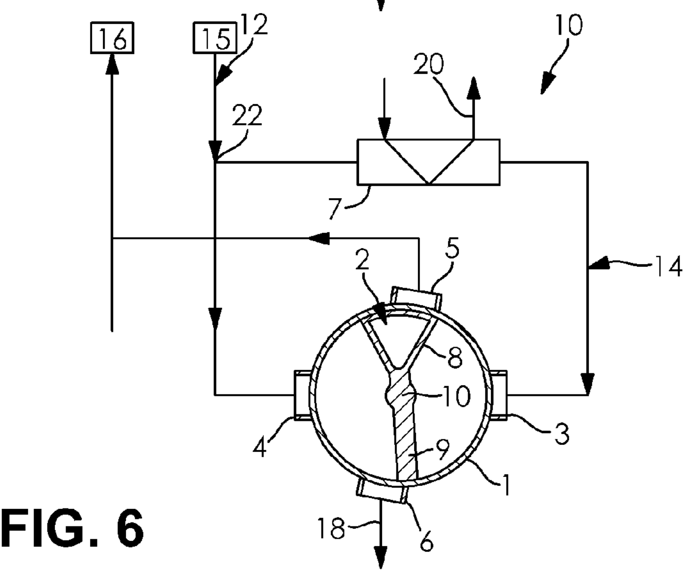
FIG. 6 illustrates the engine exhaust gas circuit of FIG. 1 during a fifth vehicle mode.

FIG. 6, shows an accelerating mode, wherein when the vehicle is accelerating, the first portion 8 of the rotary flap 2 closes the gas outlet 6 to intake 16. In the accelerating mode, the gas from the engine flows through the primary circuit 12 and into the valve body 1 through the gas inlet 4 from the engine, and an entirety of the gas is conveyed to the environment through the gas outlet 6 to the exhaust. The gas from the outlet 15 of the engine is conveyed through the gas outlet 6 to the exhaust 6 in a shorter path compared to flowing through the bypass circuit 14.

Advantageously, the engine exhaust gas circuit 10 according to the present disclosure accomplishes multiple functions with a single valve, instead of requiring more than one valve to accomplish the functions. Typically, vehicles require a valve for vehicle mode after engine start through an EHRS system, a separate valve for the EGR system, and a bypass valve to bypass the EGR system during acceleration. The valve body 1 of the present invention eliminates the need for all the separate valves and minimizes manufacturing cost, complexity, and maintenance costs.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An engine exhaust gas circuit comprising:

a primary circuit in fluid communication with an intake of an engine and an outlet of the engine, the primary circuit conveying a gas from the outlet of the engine to the intake of the engine and includes a valve body having a rotary flap rotatably disposed in the valve body, the rotary flap selectively permits the gas to be divided into partial mass flows to the environment and the intake of the engine or an entirety of the gas to flow to the environment; and a bypass circuit extending from a branch point intermediate the outlet of the engine and the valve body to the valve body, the bypass circuit having a heat exchanger disposed therein;

wherein the valve body includes a bypass gas inlet receiving the gas from the bypass circuit, a gas inlet from the engine receiving the gas from the primary circuit, a gas outlet to an exhaust conveying the gas to the environment, and a gas outlet to the intake of the engine conveying the gas to the intake of the engine, wherein the bypass gas inlet, the gas inlet from the engine, the gas outlet to the exhaust, and the gas outlet to the intake of the engine are independently formed in the valve body, wherein the bypass gas inlet, the gas inlet from the engine, the gas outlet to the exhaust, and the gas outlet to the intake of the engine are circumferentially disposed about the valve body, and wherein the bypass gas inlet is disposed intermediate the gas outlet to the exhaust and the gas outlet to the intake of the engine, and the gas inlet from the engine is disposed intermediate the gas outlet to the exhaust and the gas outlet to the intake of the engine.

2. The engine exhaust gas circuit of claim 1, wherein a first portion of the rotary flap is disposed intermediate the bypass gas inlet and the gas outlet to the exhaust during a gas cooling mode, wherein the bypass gas inlet, the gas inlet from the engine, the gas outlet to the exhaust, and the gas outlet to the intake of the engine are open during the gas cooling mode.

3. The engine exhaust gas circuit of claim 1, wherein a first portion of the rotary flap divides the gas entering the valve body through the bypass gas inlet and a second portion of the rotary flap closes the gas inlet from the engine during a bypass mode, wherein the bypass gas inlet, the gas outlet to the intake of the engine, and the gas outlet to the exhaust are open during the bypass mode, and wherein an entirety of the gas from the outlet of the engine flows through the bypass circuit during the bypass mode.

4. The engine exhaust gas circuit of claim 1, wherein a first portion of the rotary valve is disposed intermediate the gas inlet from the engine and the gas outlet to the exhaust during a start-up mode, wherein the bypass gas inlet, the gas inlet from the engine, the gas outlet to the exhaust, and the gas outlet to the intake of the engine are open during the start-up mode.

5. The engine exhaust gas circuit of claim 1, wherein a portion of the rotary valve closes the gas outlet to the intake of the engine during an accelerating mode, wherein the bypass gas inlet, the gas inlet from the engine, and the gas outlet to the exhaust are open during the accelerating mode, wherein an entirety of the gas from the outlet of the engine flows through the gas outlet to the exhaust to the environment during the accelerating mode.

6. An engine exhaust gas circuit comprising:

a primary circuit in fluid communication with an intake of an engine and an outlet of the engine, the primary circuit conveying a gas from the outlet of the engine to the intake of the engine and includes a valve body having a rotary flap rotatably disposed in the valve body, the rotary flap selectively permits the gas to be divided into partial mass flows to the environment and the intake of the engine or an entirety of the gas to flow to the environment; and a bypass circuit extending from a branch point intermediate the outlet of the engine and the valve body to the valve body, the bypass circuit having a heat exchanger disposed therein;

wherein the valve body includes a bypass gas inlet receiving the gas from the bypass circuit, a gas inlet from the engine receiving the gas from the primary circuit, a gas outlet to an exhaust conveying the gas to the environment, and a gas outlet to the intake of the engine conveying the gas to the intake of the engine, wherein the bypass gas inlet, the gas inlet from the engine, the gas outlet to the exhaust, and the gas outlet to the intake of the engine are independently formed in the valve body, wherein the bypass gas inlet, the gas inlet from the engine, the gas outlet to the exhaust, and the gas outlet to the intake of the engine are circumferentially disposed about the valve body, wherein a first portion of the rotary flap divides the gas entering the valve body through the bypass gas inlet and a second portion of the rotary flap closes the gas inlet from the engine during a bypass mode, wherein the bypass gas inlet, the gas outlet to the intake of the engine, and the gas outlet to the exhaust are open during the bypass mode, and wherein an entirety of the gas from the outlet of the engine flows through the bypass circuit during the bypass mode.

7. An engine exhaust gas circuit comprising:

a primary circuit in fluid communication with an intake of an engine and an outlet of the engine, the primary circuit conveying a gas from the outlet of the engine to the intake of the engine and includes a valve body having a rotary flap rotatably disposed in the valve body, the rotary flap selectively permits the gas to be divided into partial mass flows to the environment and the intake of the engine or an entirety of the gas to flow to the environment; and a bypass circuit extending from a branch point intermediate the outlet of the engine and the valve body to the valve body, the bypass circuit having a heat exchanger disposed therein;

wherein the valve body includes a bypass gas inlet receiving the gas from the bypass circuit, a gas inlet from the engine receiving the gas from the primary circuit, a gas outlet to an exhaust conveying the gas to the environment, and a gas outlet to the intake of the engine conveying the gas to the intake of the engine, wherein the bypass gas inlet, the gas inlet from the engine, the gas outlet to the exhaust, and the gas outlet to the intake of the engine are independently formed in the valve body, wherein the bypass gas inlet, the gas inlet from the engine, the gas outlet to the exhaust, and the gas outlet to the intake of the engine are circumferentially disposed about the valve body, wherein a portion of the rotary valve closes the gas outlet to the intake of the engine during an accelerating mode, wherein the bypass gas inlet, the gas inlet from the engine, and the gas outlet to the exhaust are open during the accelerating mode, and wherein an entirety of the gas from the outlet of the engine flows through the gas outlet to the exhaust to the environment during the accelerating mode.

* * * * *